July 12, 1949.                R. A. HIRSCHMUGL                2,476,193
                                BEARING ASSEMBLY
                              Filed May 14, 1947

Inventor
ROBERT AUGUST HIRSCHMUGL
by
Attys.

Patented July 12, 1949

2,476,193

UNITED STATES PATENT OFFICE 2,476,193

BEARING ASSEMBLY

Robert A. Hirschmugl, McHenry, Ill.

Application May 14, 1947, Serial No. 747,951

9 Claims. (Cl. 301—5.7)

This invention relates to a bearing assembly adapted particularly for use in roller skate wheels.

The bearing assemblies heretofore known in the art, which have been adapted for roller skate use, have been subject to certain disadvantages. Some known arrangements have not permitted ready access to the bearing elements for purposes of lubrication or for removal of the elements for repair or replacement. Other known constructions offering access to the bearing units, frequently do not secure the bearing and associated units from inadvertent disassembly. Most prior constructions have also involved expensive manufacturing methods for their production.

In accordance with this invention a bearing assembly is provided wherein the bearings are readily accessible for repair and removal, but secure from accidental disassembly. In addition a bearing assembly constructed in accordance with this invention may be economically fabricated by low cost, high quantity production methods. The major elements of the assembly may be made by stamping operations and will accommodate standard antifriction bearing units.

A bearing assembly constructed in accordance with this invention employs a main bearing container member of generally cup-shaped configuration. A standard manufacture antifriction bearing unit is inserted in the bearing container and rests against the base of the container. Radially extending openings or indentations are circumferentially located on the container adjacent its open end. A split ring keeper member is inserted in the container and the openings or indentations receive therein radially extending projections on such split ring keeper member. The split ring thus secures and accurately axially positions the bearing unit and the bearing assembly may be inserted in a cup-shaped recess axially located in the skate wheel. The base of this recess has an axial hole for receiving an axle of the skate. The axle is inserted through the wheel hole and on through a suitable aperture in the base of the bearing container and is journaled by the bearing unit.

Accordingly an object of this invention is to provide an improved antifriction bearing assembly adapted particularly for skate wheels.

Another object of this invention is to provide a bearing assembly which is accessible for lubrication purposes and readily disassembled for mechanical repairs or replacement.

A further object is to provide a bearing assembly comprising a housing and an antifriction bearing unit inserted therein such as will maintain the bearing unit in fixed axial position.

A still further object of this invention is to provide an improved bearing assembly of economical manufacture.

The specific nature of the invention, as well as the further objects and advantages thereof, will become apparent to those skilled in the art from the following detailed description of the annexed sheet of drawings, which, by way of preferred example only, illustrate one specific embodiment of the invention.

Figure 1:
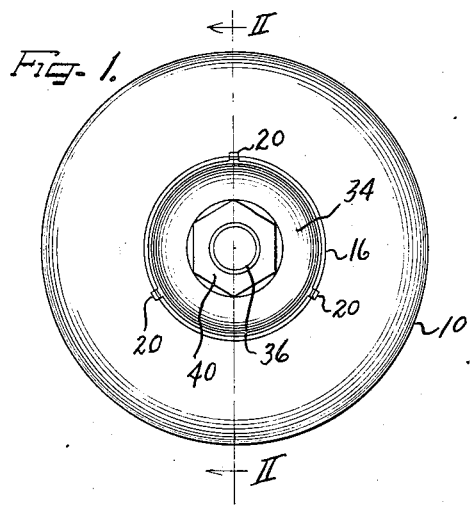
Figure 1 is an elevational view of a roller skate wheel, showing the bearing assembly embodying this invention, in co-operation with an axle of the skate.
Figure 2:
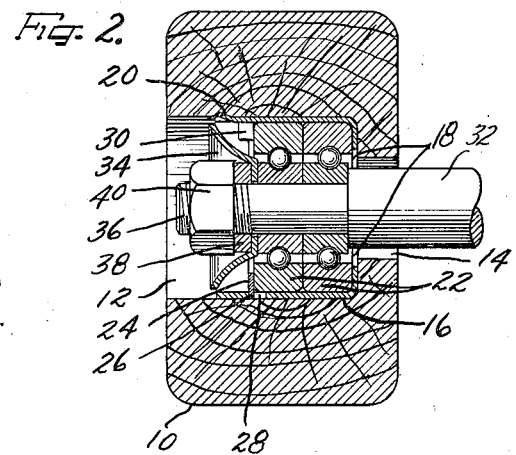
Figure 2 is a longitudinal sectional view taken along the plane II—II in Figure 1.
Figure 3:
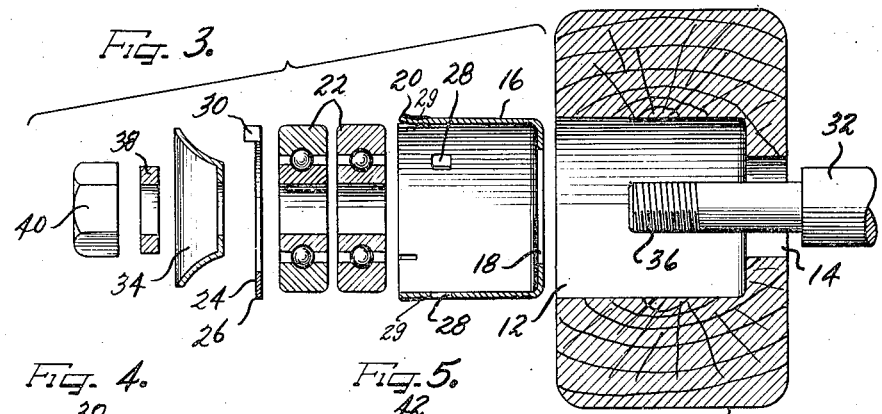
Figure 3 is a view similar to Figure 2 but with the units shown in exploded relation to each other.
Figure 4:
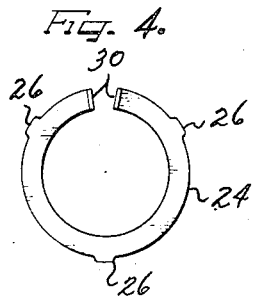
Figure 4 is a plan view of the split ring retaining member.

It will be understood by those familiar with the art that a bearing assembly as described may be utilized for other purposes than the illustrated example of a skate wheel.

Similar numerals refer to similar parts throughout the several views.

A skate wheel 10 of the type commonly used for indoor rinks is illustrated in several views. The wheel 10 defines an axially located, cup-shaped recess 12. An axially located, reduced diameter hole 14 provides a passageway through the wheel 10 into the recess 12. A bearing container 16 of generally cup-shaped configuration having a centrally located aperture 18 in its base is pressed into the recess 12 of wheel 10. Radially deflected ears 20 secure the container member 16 from reverse movement. An antifriction bearing unit 22, which may comprise any standard manufacture unit, such as a pair of ball bearings, is disposed within the container 16 adjacent the aperture 18. A split ring keeper member 24 is provided for positioning and securing the bearing unit 22 within housing 16. The split ring 24 has radially extending projections 26 for insertion within the openings 28 peripherally located on the container 16. The projections 26 thus secure the split ring 24 and the adjacent bearing unit 22 against axial movement.

Figure 5:
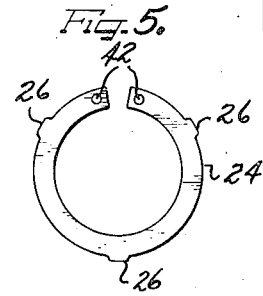
Figure 5 is a plan view illustrating a modification of the split ring retaining member.

To facilitate the manual contraction of the ring 24 for assembly or disassembly purposes, the split ring 24 is provided with axially deflected ears 30. Such ears may be grasped by a tool to compress the ring 24 for insertion against the bearing unit 22 and for locating the projections 26 in the openings 28. Alternatively, the ends of ring 24 may be provided with tool receiving holes 42, as shown in Figure 5.

The skate axle 32 is inserted through the thus assembled wheel and bearing assembly and a dust-cap washer 34 is inserted over the threaded portion 36 of the axle 32. A standard washer 38 is next slipped over the threaded portion 36 adjacent the dust-cap washer 34. A standard nut 40 is provided for axially tightening the axle 32 against the bearing unit 22 and the associated dust-cap 34 and washer 38.

The bearing assembly as thus completed is secured against inadvertent disassembly. Furthermore, the bearing unit 22 is accurately axially positioned by the split ring member 24. This accurate positioning is determined by the location of the outer wall of the holes 28 in the container member 16. It can be readily seen that such location can be accurately accomplished and yet economical production methods utilized. The use of standard bearings as the unit 22 makes further reductions in cost.

The bearing assembly may be easily manually disassembled by removal of the nut 40, the washer 38 and the dust cap 34 and then applying a tool to the deflected ears 30 to contract ring 24 for removal.

The exterior of the container 16 may be knurled as indicated at 29 to supplement the holding action of the ears 20 or, under certain circumstances, the said ears 20 may be omitted and the knurled or roughened outer surface of the container 16 will prevent relative movement of the container and the wheel into which it is driven.

It will of course be understood that various details of construction may be modified through a wide range without departing from the principles of this invention, and it is, therefore, not the purpose to limit the patent granted hereon otherwise than necessitated by the scope of the appended claims.

I claim as my invention:

1. A bearing assembly comprising a cup-shaped, stamped housing defining a generally cylindrical recess open at one end, an annular antifriction bearing unit insertable within said housing through said open end, and seating against the bottom of said housing, said bearing unit being adapted to journal an inserted shaft with respect to said housing, said housing having a plurality of circumferentially spaced apertures in its peripheral wall, said apertures being located intermediate the inserted position of said bearing unit and said open end of said recess, and a split ring having an annular body portion and generally radially projecting finger portions respectively engageable in said apertures, said ring being contractible to permit insertion thereof into said recess through said open end, whereby said bearing unit is retained within said recess.

2. A bearing assembly comprising a cup-shaped, stamped housing defining a generally cylindrical recess open at one end, an annular antifriction bearing unit insertable within said housing through said open end, and seating against the bottom of said housing, said bearing unit being adapted to journal an inserted shaft with respect to said housing, said housing having a plurality of circumferentially spaced apertures in the peripheral wall, said apertures being located intermediate the inserted position of said bearing unit and said open end of said recess, a split ring having an annular body portion and generally radially projecting finger portions respectively engageable in said apertures, said ring being contractible to permit insertion thereof into said recess through said open end, whereby said bearing unit is retained within said recess, and means for facilitating manual contraction of said ring comprising outturned ears on each circumferential end of said ring adapted to be engaged by a tool for contracting said ring.

3. A bearing assembly comprising a cup-shaped, stamped housing defining a generally cylindrical recess open at one end, an annular antifriction bearing unit insertable within said housing through said open end, and seating against the bottom of said housing, said bearing unit being adapted to journal an inserted shaft with respect to said housing, said housing having a plurality of circumferentially spaced apertures in the peripheral wall, said apertures being located intermediate the inserted position of said bearing unit and said open end of said recess, a split ring having an annular body portion and generally radially projecting finger portions respectively engageable in said apertures, said ring being contractible to permit insertion thereof into said recess through said open end, whereby said bearing unit is retained within said recess, and the circumferential ends of said split ring each having an aperture therein adapted for engagement by a tool for contracting said ring.

4. A bearing assembly for skate wheels comprising a cup-shaped, stamped housing adapted for insertion in a wheel and defining a generally cylindrical recess open at one end, an annular antifriction bearing unit insertable within said housing through said open end, and seating against the bottom of said housing, said housing having a plurality of circumferentially spaced apertures in the peripheral wall, each of said apertures having the wall proximate to said open end of planar configuration perpendicular to the axis of said recess, a split ring having an annular body portion and generally radially projecting finger portions respectively engageable in said apertures, said ring being contractible to permit insertion thereof into said recess through said open end, the displacement of said planar aperture wall from the bottom of said housing being selected with respect to the combined axial lengths of said bearing unit and ring to snugly retain said bearing unit in said housing.

5. A bearing assembly for skate wheels comprising a cup-shaped, stamped housing adapted for insertion in a wheel and defining a generally cylindrical recess open at one end, said housing having a plurality of radially deflected ears adjacent said open end, whereby said housing is secured from reverse movement in the wheel and from rotary movement with respect to the wheel, an annular anti-friction bearing unit insertable within said housing through said open end and seating against the bottom of said housing, said bearing unit being adapted to journal an inserted shaft with respect to said housing, said housing having a plurality of circumferentially spaced apertures in its peripheral wall, said apertures being located intermediate the inserted position of said bearing unit and said open end of said recess, and a split ring having an annular body portion and generally radially projecting finger portions respectively engageable in said apertures, said ring being contractable to permit insertion thereof into said recess through said open end, whereby said bearing unit is retained within said recess.

6. A bearing assembly for skate wheels comprising a cup-shaped, stamped housing adapted for insertion in a wheel and defining a generally cylindrical recess open at one end, said housing having a plurality of radially deflected ears adjacent said open end, whereby said housing is secured from reverse movement in the wheel and from rotary movement with respect to the wheel, an annular anti-friction bearing unit insertable within said housing through said open end and seating against the bottom of said housing, said bearing unit being adapted to journal an inserted shaft with respect to said housing, said housing having a plurality of circumferentially spaced apertures in its peripheral wall, said apertures being located intermediate the inserted position of said bearing unit and said open end of said recess, and a split ring having an annular body portion and generally radially projecting finger portions respectively engageable in said apertures, said ring being contractable to permit insertion thereof into said recess through said open end, whereby said bearing unit is retained within said recess, and means for facilitating manual contraction of said ring comprising outturned ears on each circumferential end of said ring adapted to be engaged by a tool for contracting said ring.

7. A bearing assembly for skate wheels comprising a cup-shaped, stamped housing adapted for insertion in a wheel and defining a generally cylindrical recess open at one end, said housing having a plurality of radially deflected ears adjacent said open end, whereby said housing is secured from reverse movement in the wheel and from rotary movement with respect to the wheel, an annular anti-friction bearing unit insertable within said housing though said open end and seating against the bottom of said housing, said bearing unit being adapted to journal an inserted shaft with respect to said housing, said housing having a plurality of circumferentially spaced apertures in its peripheral wall, said apertures being located intermediate the inserted position of said bearing unit and said open end of said recess, and a split ring having an annular body portion and generally radially projecting finger portions respectively engageable in said apertures, said ring being contractable to permit insertion thereof into said recess through said open end, whereby said bearing unit is retained within said recess, and the circumferential ends of said split ring each having an aperture therein adapted for engagement by a tool for contracting said ring.

8. A bearing assembly for skate wheels comprising a cup-shaped, stamped housing adapted for insertion in a wheel and defining a generally cylindrical recess open at one end, said housing having a plurality of radially deflected ears adjacent said open end, whereby said housing is retained within the wheel and secured from rotary movement with respect to the wheel, an annular anti-friction bearing unit insertable within said housing through said open end and seating against the bottom of said housing, said housing having a plurality of circumferentially spaced apertures in the peripheral wall, each of said apertures having the wall proximate to said open end of planar configuration perpendicular to the axis of said recess, a split ring having an annular body portion and generally radially projecting finger portion respectively engageable in said apertures, said ring being contractable to permit insertion thereof into said recess through said open end, the displacement of said planar aperture wall from the bottom of said housing being selected with respect to the combined axial length of said bearing unit and ring to snugly retain said bearing unit in said housing.

9. In a bearing assembly for skate wheels a cup-shaped, stamped housing adapted for insertion in a wheel and defining a generally cylindrical recess open at one end, said housing having a plurality of radially deflected ears to secure said housing in the wheel from reverse movement and from rotary movement with respect to the wheel, and said housing having a plurality of circumferentially spaced apertures in its peripheral wall whereby a split ring retaining member may be secured to retain an annular anti-friction bearing unit inserted within said housing through said open end.

ROBERT A. HIRSCHMUGL.

REFERENCES CITED

The following references are of record in the file of this patent:

UNITED STATES PATENTS

| Number | Name | Date |
| --- | --- | --- |
| 876,836 | Plimpton | Jan. 14, 1908 |
| 1,362,215 | Appelt | Dec. 14, 1920 |
| 2,040,489 | Large | May 12, 1936 |
| 2,136,155 | Spicacci | Nov. 8, 1938 |
| 2,316,498 | Biczak | Apr. 13, 1943 |
| 2,333,400 | Ware | Nov. 2, 1943 |
| 2,377,855 | Ambrosini | June 12, 1945 |